United States Patent
Mueller et al.

(10) Patent No.: US 9,890,966 B2
(45) Date of Patent: Feb. 13, 2018

(54) AIR-CONDUCTING DEVICE FOR A WHEEL-ARCH VENTILATION ARRANGEMENT

(71) Applicant: Dr. Ing. h.c. F. Porsche Aktiengesellschaft, Stuttgart (DE)

(72) Inventors: Benjamin Mueller, Leutenbach (DE); Christoph Bauernfeind, Sachsenheim (DE)

(73) Assignee: DR. ING. H.C.F. PORSCHE AKTIENGESELLSCHAFT, Stuttgart (DE)

( * ) Notice: Subject to any disclaimer, the term of this patent is extended or adjusted under 35 U.S.C. 154(b) by 380 days.

(21) Appl. No.: 14/311,705

(22) Filed: Jun. 23, 2014

(65) Prior Publication Data

US 2014/0378043 A1 Dec. 25, 2014

(30) Foreign Application Priority Data

Jun. 21, 2013 (DE) .................. 10 2013 106 526

(51) Int. Cl.
| | |
|---|---|
| *B62D 25/18* | (2006.01) |
| *F24F 7/04* | (2006.01) |
| *F24F 7/00* | (2006.01) |
| *B62D 25/16* | (2006.01) |
| *B62D 35/00* | (2006.01) |

(52) U.S. Cl.
CPC ............... *F24F 7/04* (2013.01); *B62D 25/16* (2013.01); *B62D 35/00* (2013.01)

(58) Field of Classification Search
CPC ...... B62D 25/16; B62D 25/02; B62D 25/161; B62D 35/005; B62D 35/008; F24F 7/04; F24F 7/10; B60R 13/04
See application file for complete search history.

(56) References Cited

U.S. PATENT DOCUMENTS

| | | | | |
|---|---|---|---|---|
| 1,974,535 A | * | 9/1934 | Graffis ................ | B62D 25/16 180/69.2 |
| 2,729,463 A | * | 1/1956 | Ludwig ............... | B62D 25/18 280/847 |
| 2,733,772 A | * | 2/1956 | Lamb .................. | B60K 11/08 180/68.1 |

(Continued)

FOREIGN PATENT DOCUMENTS

| | | |
|---|---|---|
| DE | 10104649 | 8/2002 |
| DE | 10213188 | 10/2003 |

(Continued)

OTHER PUBLICATIONS

"Wheel well body vents—FFCars" Feb. 5, 2012, http://www.ffcars.com/forums/17-factory-five-roadsters/285940-more-areodynamic-air-management-thinking-wheel-well-body-vents.html.*

(Continued)

*Primary Examiner* — Steven B McAllister
*Assistant Examiner* — Steven Anderson, II
(74) *Attorney, Agent, or Firm* — Gerald E. Hespos; Michael J. Porco; Matthew T. Hespos

(57) ABSTRACT

A fender has an air-conducting device with air-conducting lamellae fastened in a holding frame. The air-conducting device has, in the fender, an outer opening into which the air-conducting lamellae project. An air mass flowing into the wheel arch or the fender is conducted to the outside by the air-conducting lamellae.

3 Claims, 4 Drawing Sheets

(56) References Cited

U.S. PATENT DOCUMENTS

| | | | | |
|---|---|---|---|---|
| 2,892,395 A * | 6/1959 | Goettl | ................... | F24F 13/075 |
| | | | | 403/122 |
| 3,341,222 A * | 9/1967 | Roberts | ................. | B62D 25/16 |
| | | | | 280/851 |
| 4,385,549 A * | 5/1983 | Bauer | ..................... | B60H 1/26 |
| | | | | 296/208 |
| 7,163,073 B2 | 1/2007 | Schmid et al. | | |
| 8,172,314 B2 | 5/2012 | Grammer et al. | | |
| 2005/0217907 A1* | 10/2005 | Madson | ................... | F01P 5/06 |
| | | | | 180/68.1 |
| 2007/0023238 A1* | 2/2007 | Ramsay | ................... | B60T 5/00 |
| | | | | 188/71.6 |
| 2011/0214568 A1* | 9/2011 | Krantz | ............... | F16D 65/0031 |
| | | | | 95/273 |

FOREIGN PATENT DOCUMENTS

| | | | | |
|---|---|---|---|---|
| DE | 102008019923 | 10/2009 | | |
| EP | 1762470 A2 * | 3/2007 | ............ | B62D 25/16 |
| FR | 2897833 A3 * | 8/2007 | ............ | B62D 25/16 |
| JP | 2004255956 A * | 9/2004 | | |

OTHER PUBLICATIONS

Backdraft Racing, http://backdraftracing.blogspot.com/, Jan. 9, 2011.*

FFCars, http://www.ffcars.com/forums/17-factory-five-roadsters/285940-more-areodynamic-air-management-thinking-wheel-well-body-vents.html, Feb. 5, 2012.*

German Search Report dated Mar. 13, 2014.

* cited by examiner

AIR-CONDUCTING DEVICE FOR A WHEEL-ARCH VENTILATION ARRANGEMENT

CROSS REFERENCE TO RELATED APPLICATION

This application claims priority under 35 USC 119 to German Patent Appl. No. 10 2013 106 526.0 filed on Jun. 21, 2013, the entire disclosure of which is incorporated herein by reference.

BACKGROUND

1. Field of the Invention

The invention relates to an air-conducting device for a wheel-arch ventilation arrangement.

2. Description of the Related Art

DE 101 04 649 A1 discloses an air-conducting device with at least one air-conducting element that adjoins a flow duct. The flow duct connects the interior of a wheel arch, which is open toward the roadway, to the top side of the vehicle. Furthermore, DE 102 13 188 A1 discloses an air outlet opening arranged in a transverse wall of a wheel arch. An air-guiding duct is connected downstream of the air outlet opening and leads into the atmosphere.

It is an object of the invention to provide an air-conducting device that ensures aeration of the wheel arch for a front wheel of a motor vehicle.

SUMMARY OF THE INVENTION

The invention relates to an air guide that enables the air quantity flowing into the wheel arch to be discharged through an outlet opening in the fender, and thus achieves an optimum reduction in air resistance and, during high-speed travel, creates additional downforce on the vehicle owing to the air guide. More particularly, the air guide is incorporated into an opening of the wheel-arch shell and comprises a holding frame and air-conducting lamellae connected to the holding frame. The air-conducting lamellae are fastened in the holding frame to project into an outer opening of the fender. Additionally, the air-conducting lamellae are spaced apart from one another, are parallel and are inclined at an angle counter to the direction of travel.

The outer opening in the fender preferably is approximately L-shaped and has adjoining first and second regions. The first region is approximately square and is above a semicircular wheel-arch contour. The second region follows the semicircular wheel-arch contour and is composed of a downwardly running elongate gap. The L-shaped outer opening in the fender enables the air flowing into the wheel arch to emerge from the fender both upwardly and also to the side, thereby resulting in a distribution of the exiting air masses. The guidance of the air entering the wheel arch forms a type of diffuser so that a downforce on the vehicle can be realized.

The air guide preferably is arranged between a two-part wheel-arch shell and, an air-conducting duct with an inner air inflow opening and an outer air outflow opening is formed by the holding frame. The inflow opening is closed off by a plastic grate. This arrangement permits a connection to the fender and a fastening in the wheel-arch shell. The plastic grate provides protection against stone impact.

The holding frame for the air-conducting lamellae has an edge contour that is designed to follow a shape profile of the outer opening in the fender. Thus, the holding element is flush with the cutout of the outer opening, and a precise arrangement of the ends of the air-conducting lamellae with respect to the outer opening is obtained.

The air-conducting lamellae are mounted in the holding frame by having opposite legs of the holding frame formed with wedge-shaped notches into which tapered wedge shaped projections of the air-conducting lamellae engage with clamping action. In this way, the air-conducting lamellae are fastened securely in the holding frame. The lamellae are clipped into the frame and are thus exchangeable.

Furthermore, the air-conducting lamellae are arranged in the holding frame transversely with respect to the direction of travel and the lamellae in the first region of the opening extend over approximately the entire width of the fender and the lamellae in the second region of the opening have a smaller extent. This design with differently sized outer openings and with air-conducting lamellae arranged therein causes a greater air mass flow to be discharged in the main flow direction.

An exemplary embodiment of the invention is illustrated in the drawings and will be described in more detail below.

DETAILED DESCRIPTION OF THE PREFERRED EMBODIMENTS

Figure 1:
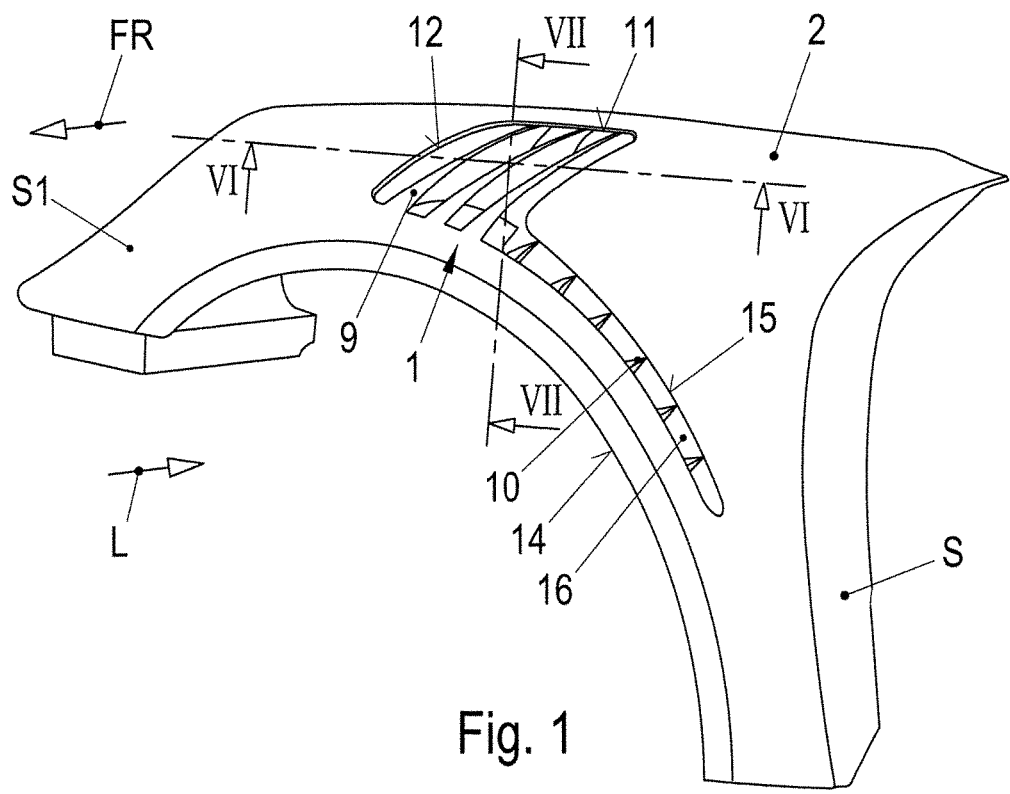
FIG. 1 is an external view of a front fender of a motor vehicle with, at the inside, an air-conducting device behind an outer opening in the fender.

An air-conducting device 1 for a wheel-arch aeration arrangement in a motor vehicle is arranged in a fender 2 above the wheel arch 3 and defines an air guide 5 directed out from the interior of the wheel arch 3.

The air guide 5 is incorporated in an opening 6 of a wheel-arch shell 7 and comprises a holding frame 8 with air-conducting lamellae 9, 10 connected at the inside of thee holding frame 8. The air-conducting lamellae are fastened or fixed in the holding frame 3 so as to project into an outer opening 11 of the fender 2. The air-conducting lamellae 9, 10 are spaced apart from one another, are parallel to one another and are inclined at an angle α counter to the direction of travel FR.

The outer opening 11 in the fender 2 is approximately L-shaped. A first region 12 of the opening 11 is above a semicircular wheel-arch contour 14 and is approximately square. An adjoining second region 15 of the opening 11 follows the semicircular wheel-arch contour 14 and includes a downwardly running elongate gap 16.

The air guide 5 preferably is arranged between a two-part wheel-arch shell 7, 7a and, by means of the holding frame 8, an air-conducting duct with an inner inflow opening 17 in the region of the wheel arch 3 and with an outer air outflow opening 18 in the region of the fender 2 is formed. The inflow opening 17 is closed off by a plastic grate.

The holding frame 8 for the air-conducting lamellae 9, 10 has an edge contour 19 that follows the shape profile of the outer opening 11 in the fender 2.

The holding frame 8 has opposite legs 20, 21 for mounting the air-conducting lamellae 9, 10. The legs 20, 21 have wedge-shaped notches 22 or receptacles, and the air-conducting lamellae 9, 10 have corresponding projections 23 that are tapered in a wedge shape corresponding to the notches 22. The projections 23 of the air-conducting lamellae 9, 10 engage the notches 22 with clamping or clipping-in action.

Figure 2:
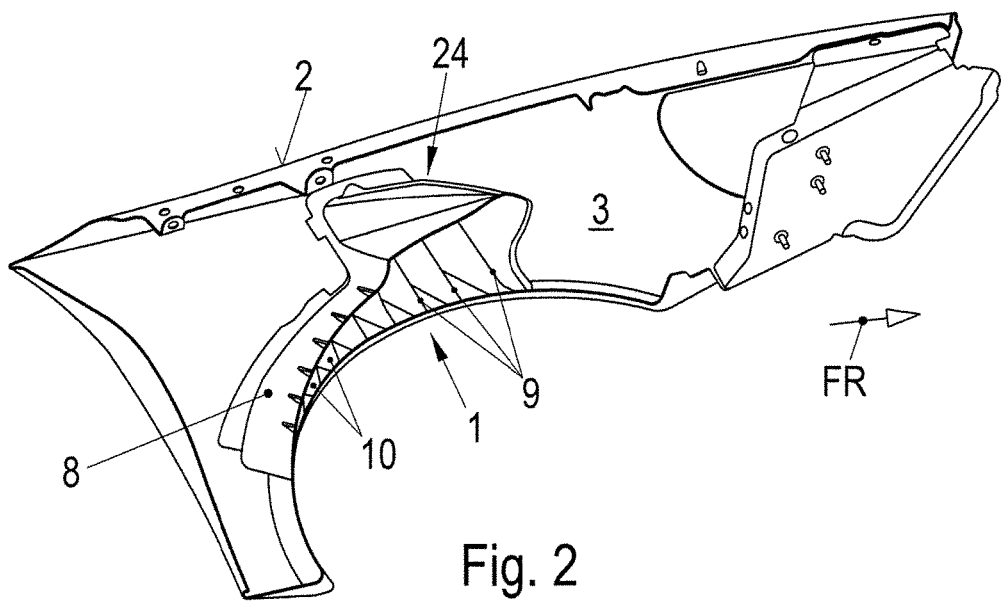
FIG. 2 is a view of the inside of the front fender with, at the inside, the air-conducting device composed of a holding frame and air-conducting lamellae.
Figure 3:
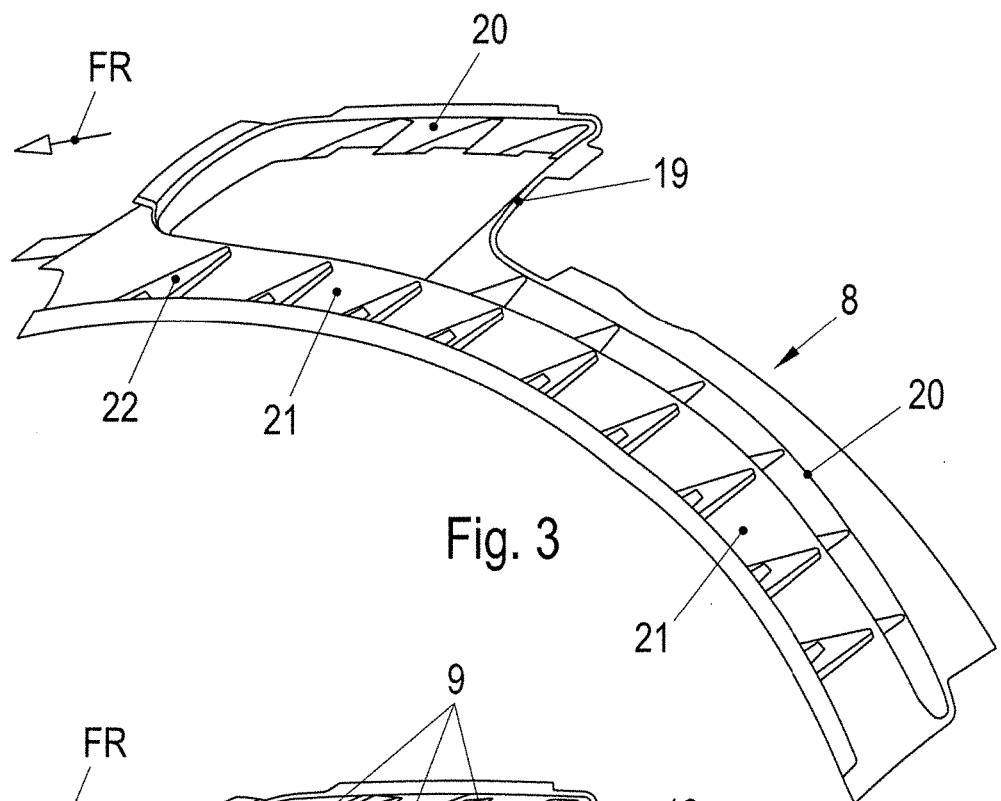
FIG. 3 is a plan view of the holding frame for the air-conducting lamellae, with wedge-shaped notches arranged in side legs for mounting the air-conducting lamellae.
Figure 4:
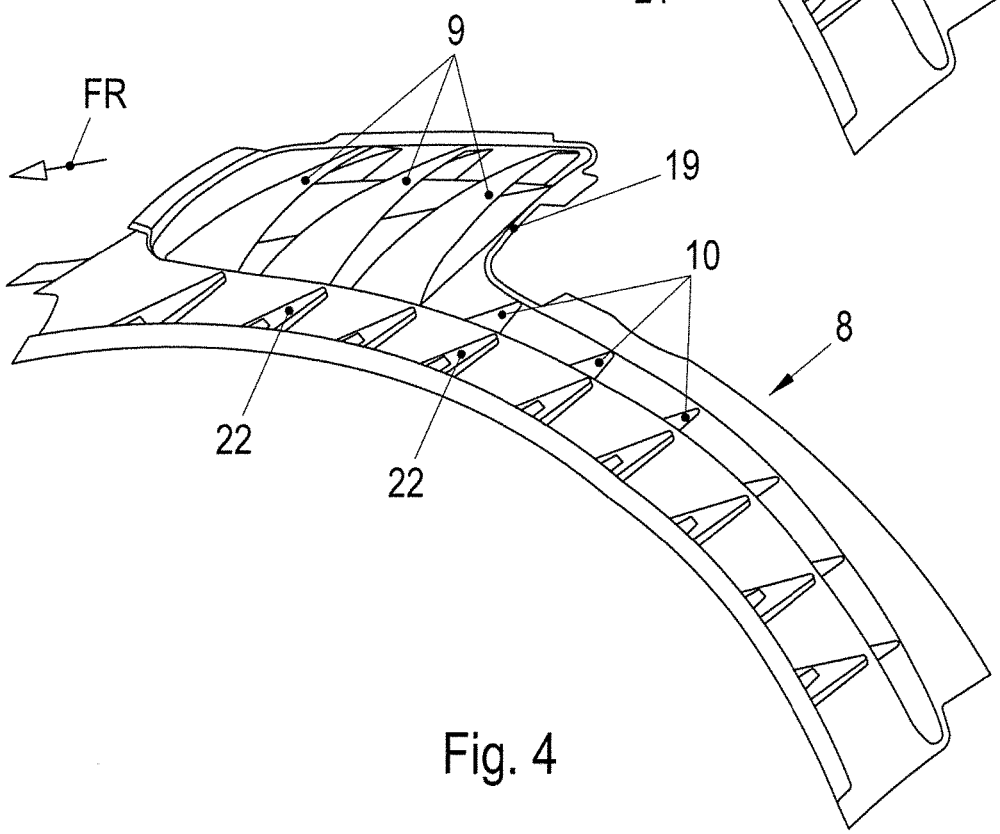
FIG. 4 is a plan view of the holding frame as per FIG. 3 with inserted air-conducting lamellae.
Figure 5:
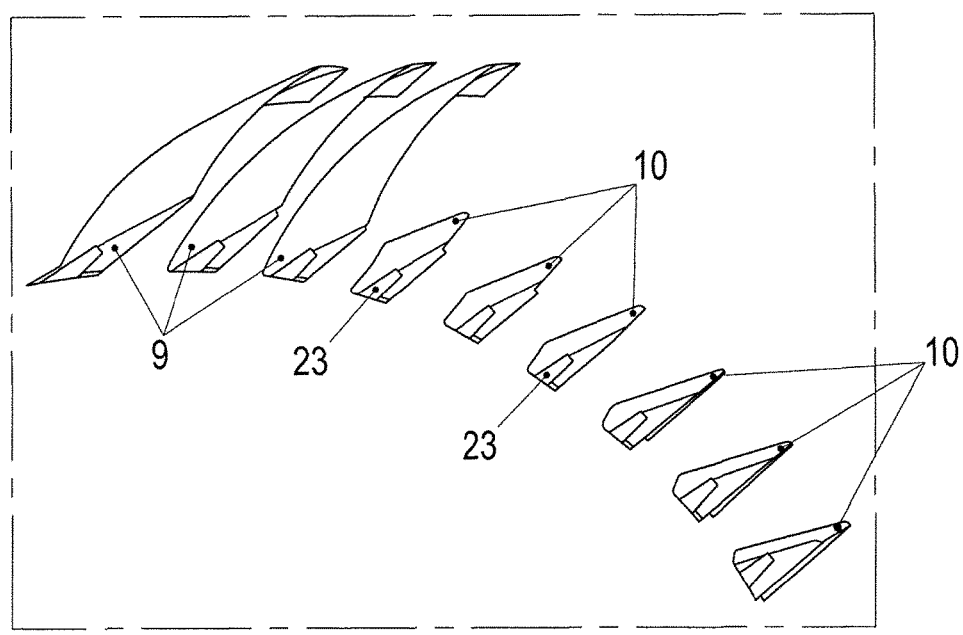
FIG. 5 shows a view of a lamellae set to be inserted into the holding frame.
Figure 6:
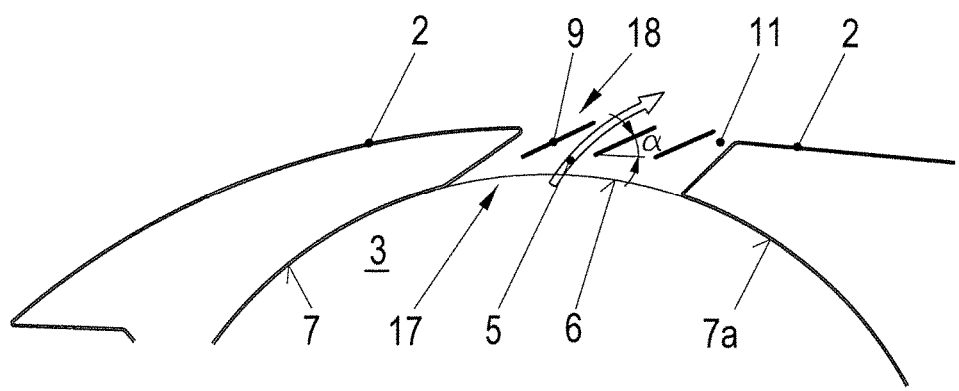
FIG. 6 is a cross-section taken along line VI-VI in FIG. 1, through the air-conducting device.
Figure 7:
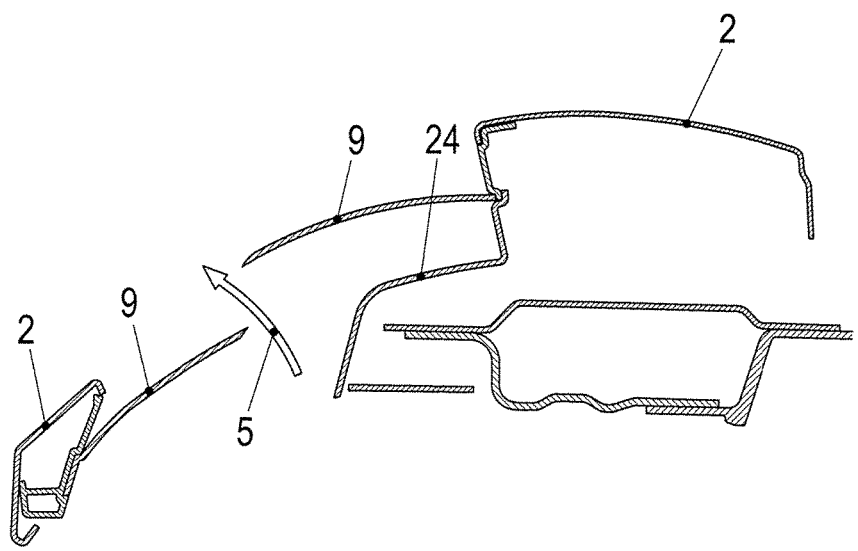
FIG. 7 shows a cross-section taken along line VII-VII in FIG. 1, through the air-conducting device with a cover element.

A cover 24 is fastened to the holding frame 8 to form the air-conducting duct between the fender 2 and the wheel-arch shell 7, 7a. The cover 24 is illustrated in more detail in FIGS. 2 and 7.

The air-conducting lamellae 9, 10 are arranged in the holding frame 8 transversely with respect to the direction of travel FR. In the first region 12 of the opening 11, the lamellae 9 extend over approximately the entire width of the fender 2. In the second region 15 of the opening 11, the lamellae 10 have a smaller extent.

As indicated in FIG. 1, the incoming air flow L is conducted into the wheel-arch shell 7, 7a and is discharged outward through the outer opening 11 by means of the air-conducting lamellae 9, 10. The fender 2 is connected by way of its rear end S to a B pillar of the vehicle, and the front end S1 is fastened to a front skirt of the vehicle. The front part subsequently is fastened to the fender.

What is claimed is:

1. An air-conducting device for achieving ventilation in a wheel arch of a motor vehicle and a down force on the motor vehicle, the wheel arch having opposite front and rear ends, the air-conducting device, comprising:
   a wheel arch contour defining a downwardly concave arcuate edge region of the wheel arch adjacent a lateral outer side of the motor vehicle;
   a fender arranged above the wheel arch and having a fender opening with an outer peripheral edge, the fender opening including a first region arranged above the wheel arch contour at a position between the front and rear ends of the wheel arch, the first region of the fender opening having a front end forward of a highest point of the wheel arch contour and a rear end rearward of the highest point on the wheel arch contour and the first region of the fender opening having a first width, and a second region of the fender opening defining an elongated gap with a second width narrower than the first width and extending downward and rearward from the first region and substantially along a rear part of the wheel arch contour;
   a wheel arch shell below the fender and having a wheel arch opening aligned with the fender opening;
   a holding frame mounted between the wheel arch shell and the fender at a position aligned with the wheel arch opening and the fender opening;
   a cover fastened to the holding frame and forming a duct between the wheel arch opening and the fender opening; and
   air conducting lamellae connected in the holding frame so as to project into the fender opening, the air conducting lamellae being spaced apart from one another in a straight forward direction of travel of the motor vehicle and parallel to one another and being inclined at an angle counter to the direction of travel so that the lower ends of the lamellae are forward of upper ends of the lamellae to define an air guide directed out from an interior of the wheel arch
   wherein the holding frame has opposite first and second legs with wedge-shaped notches, and the air-conducting lamellae have opposite first and second ends with tapered wedge-shaped projections that engage in the notches with clamping or clipping-in action.

2. The air-conducting device of claim 1, wherein the holding frame is connected, on one side in the first region of the fender opening, to the cover that is part of the air-conducting duct between the fender and the wheel-arch shell.

3. The air-conducting device of claim 1, wherein the air-conducting lamellae in the first region of the fender opening have a greater width transverse to the direction of travel than the air-conducting lamellae arranged in the second region.

* * * * *